United States Patent
Cheng et al.

(10) Patent No.: US 9,912,968 B2
(45) Date of Patent: Mar. 6, 2018

(54) DECODING APPARATUS CAPABLE OF CONTROLLING REPETITION NUMBER OF SCAN PROCEDURE BASED ON AT LEAST ONE SYNTAX ELEMENT DECODING RESULT AND RELATED METHOD

(71) Applicant: MEDIATEK INC., Hsin-Chu (TW)

(72) Inventors: Chia-Yun Cheng, Hsinchu County (TW); Chi-Cheng Ju, Hsinchu (TW); Yung-Chang Chang, New Taipei (TW); Chih-Ming Wang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 390 days.

(21) Appl. No.: 14/767,912

(22) PCT Filed: Jan. 21, 2015

(86) PCT No.: PCT/CN2015/071220
§ 371 (c)(1),
(2) Date: Aug. 13, 2015

(87) PCT Pub. No.: WO2015/110011
PCT Pub. Date: Jul. 30, 2015

(65) Prior Publication Data
US 2016/0021378 A1    Jan. 21, 2016

Related U.S. Application Data

(60) Provisional application No. 61/931,094, filed on Jan. 24, 2014.

(51) Int. Cl.
*H04N 19/91*    (2014.01)
*H04N 19/176*    (2014.01)
(Continued)

(52) U.S. Cl.
CPC ........... *H04N 19/91* (2014.11); *H04N 19/129* (2014.11); *H04N 19/176* (2014.11); *H04N 19/18* (2014.11);
(Continued)

(58) Field of Classification Search
CPC .............................. H04N 19/91; H04N 19/44
See application file for complete search history.

(56) References Cited

U.S. PATENT DOCUMENTS 8,494,059 B1 * 7/2013 Guan ..................... H04N 19/44
348/51
2004/0120587 A1    6/2004 Chang
(Continued)

OTHER PUBLICATIONS

V. Sze & M. Budagavi, "A comparison of CABAC throughput for HEVC/H.265 vs. AVC/H264", 2013 IEEE Workshop on Signal Processing Sys. 163-170 (Oct. 2013).*
(Continued)

*Primary Examiner* — David N Werner
(74) *Attorney, Agent, or Firm* — Winston Hsu (57) ABSTRACT

A decoding apparatus has an arithmetic decoder and a controller. A counter logic of the controller generates a first statistics result according to a first syntax element decoding result. A control logic of the controller instructs the arithmetic decoder to perform a first scan procedure at least once to generate the first syntax element decoding result of transform coefficients of a transform coefficient block, controls a repetition number of a second scan procedure based at least partly on the first statistics result, and instructs the arithmetic decoder to perform the second scan procedure at least once to generate a second syntax element decoding result of the transform coefficients. The first scan procedure decodes a first coded syntax element of one transform coefficient when performed by the arithmetic decoder once.
(Continued)

The second scan procedure decodes a second coded syntax element of one transform coefficient when performed by the arithmetic decoder once.

22 Claims, 7 Drawing Sheets

(51) Int. Cl.
  *H04N 19/60*   (2014.01)
  *H04N 19/44*   (2014.01)
  *H04N 19/463*   (2014.01)
  *H04N 19/129*   (2014.01)
  *H04N 19/70*   (2014.01)
  *H04N 19/18*   (2014.01)
  *H04N 19/82*   (2014.01)

(52) U.S. Cl.
  CPC ........... *H04N 19/44* (2014.11); *H04N 19/463* (2014.11); *H04N 19/60* (2014.11); *H04N 19/70* (2014.11); *H04N 19/82* (2014.11)

(56) References Cited

U.S. PATENT DOCUMENTS

| | | | |
|---|---|---|---|
| 2005/0099522 A1* | 5/2005 | Kondo | H03M 7/40 348/345 |
| 2006/0023795 A1* | 2/2006 | Kim | H03M 7/4006 375/242 |
| 2006/0233447 A1* | 10/2006 | Matsubara | H04N 19/91 382/233 |
| 2007/0092150 A1 | 4/2007 | Chiba | |
| 2008/0266151 A1* | 10/2008 | Sankaran | H03M 7/4006 341/107 |
| 2008/0267513 A1* | 10/2008 | Sankaran | H03M 7/4006 382/232 |
| 2012/0082233 A1 | 4/2012 | Sze | |
| 2013/0003834 A1* | 1/2013 | Rojals | H04N 19/196 375/240.12 |
| 2013/0188727 A1 | 7/2013 | Lou | |
| 2014/0334552 A1* | 11/2014 | Yamaguchi | H04N 19/91 375/240.25 |

OTHER PUBLICATIONS

J. Hahm & C.M. Kyung, "Efficient CABAC Rate Estimation for H.264/AVC Mode Decision", 20 IEEE Trans. on Circuits & Sys. for Video Tech. 310-316.*

"International Search Report" dated Mar. 25, 2015 for International application No. PCT/CN2015/071220, International filing date: Jan. 21, 2015.

* cited by examiner

| Index | 0 | 1 | 2 | 3 |
|---|---|---|---|---|
| 0 | 2 |   |   |   |
| 1 |   | 2 |   |   |
| 2 | 2 |   | 1 |   |
| 3 |   | 1 |   |   |

| Index | 0 | 1 | 2 | 3 |
|---|---|---|---|---|
| 0 | 2 |   |   |   |
| 1 |   | 3 |   |   |
| 2 | 2 |   | 1 |   |
| 3 |   | 1 |   |   |

| Index | 0 | 1 | 2 | 3 |
|---|---|---|---|---|
| 0 | 2 | | | |
| 1 | | 2 | | |
| 2 | 2 | | 1 | |
| 3 | | 1 | | |

DECODING APPARATUS CAPABLE OF CONTROLLING REPETITION NUMBER OF SCAN PROCEDURE BASED ON AT LEAST ONE SYNTAX ELEMENT DECODING RESULT AND RELATED METHOD

CROSS REFERENCE TO RELATED APPLICATIONS

This application claims the benefit of U.S. provisional application No. 61/931,094, filed on Jan. 24, 2014 and incorporated herein by reference.

FIELD OF THE INVENTION

The present invention relates to transform coefficient decoding, and more particularly, to a decoding apparatus capable of controlling a repetition number of a scan procedure based on at least one syntax element decoding result and a related method.

BACKGROUND AND RELATED ART

High Efficiency Video Coding (HEVC) is a video coding standard that is a successor to the H.264/AVC (Advanced Video Coding) standard. One of its primary objectives is to provide better compression efficiency without detectable loss in visual quality. Similarly, HEVC uses spatial and temporal prediction, transform of the prediction residual, and entropy coding of the transform and prediction information. In accordance with HEVC, the basic processing unit is a coding tree unit (CTU) that is a generalization of the H.264/AVC concept of a macroblock (MB). Each CTU has an associated quadtree structure that specifies how the CTU is subdivided. This subdivision yields coding units (CUs). A CU uses either intra prediction or inter prediction, and is subdivided into prediction units (PUs). In addition, a nested quadtree, referred to as the residual quadtree (RQT), partitions one CU into transform units (TUs). Concerning the entropy encoding, HEVC employs context-adaptive binary arithmetic coding (CABAC). Transform coefficients of each 4×4 transform coefficient block within one TU is encoded using CABAC according to a selected scan pattern, such as a diagonal scan pattern, a horizontal scan pattern, or a vertical scan pattern. In general, a scan pattern is used to convert a two-dimensional (2D) transform coefficient block into a one-dimensional (1D) transform coefficient array, and also defines a processing order for encoding the transform coefficients.

At the encoder side, one or more syntax elements are encoded for each transform coefficient in a 4×4 transform coefficient block. The decoding process is an inverse of the encoding process. Hence, at the decoder side, one or more syntax elements are decoded for each transform coefficient in a 4×4 transform coefficient block. A conventional entropy decoder uses different scan procedures (SPs) to decide different syntax elements, respectively. Specifically, the conventional entropy decoder is configured to perform a scan procedure for each coefficient locations in one 4×4 transform coefficient block. Since one 4×4 transform coefficient block has 16 transform coefficients corresponding to 16 different coefficient locations, one scan procedure is repeated 16 times. That is, the repetition number of one scan procedure is 16. However, it is possible that the entropy encoder does not encode a specific syntax element for a specific transform coefficient, performing a specific scan procedure for one coefficient location corresponding to the specific transform coefficient is redundant, which may have an impact on the decoding efficiency. Thus, there is a need for an innovative entropy decoder design which is capable of reducing the repetition number of at least one scan procedure to improve the decoding efficiency.

BRIEF SUMMARY OF THE INVENTION

One of the objectives of the claimed invention is to provide a decoding apparatus capable of controlling a repetition number of a scan procedure based on at least one syntax element decoding result and a related method.

According to a first aspect of the present invention, an exemplary decoding apparatus for decoding a bitstream of a transform coefficient block is disclosed. The transform coefficient block comprises a plurality of transform coefficients. The exemplary decoding apparatus includes an arithmetic decoder and a controller. The arithmetic decoder is configured to perform arithmetic decoding. The controller includes a counter logic and a control logic. The counter logic is configured to generate a first statistics result according to a first syntax element decoding result. The control logic is configured to instruct the arithmetic decoder to perform a first scan procedure at least once to generate the first syntax element decoding result of at least a portion of the transform coefficients, control a repetition number of a second scan procedure based at least partly on the first statistics result, and instruct the arithmetic decoder to perform the second scan procedure at least once to generate a second syntax element decoding result of at least a portion of the transform coefficients, wherein the first scan procedure decodes a first coded syntax element of one of the transform coefficients to generate a first syntax element when performed by the arithmetic decoder once, and the second scan procedure decodes a second coded syntax element of one of the transform coefficients to generate a second syntax element when performed by the arithmetic decoder once.

According to a second aspect of the present invention, an exemplary method for controlling decoding of a bitstream of a transform coefficient block is disclosed. The transform coefficient block comprises a plurality of transform coefficients. The exemplary decoding method comprises: instructing an arithmetic decoder to perform a first scan procedure at least once to generate a first syntax element decoding result of at least a portion of the transform coefficients, wherein the first scan procedure decodes a first coded syntax element of one of the transform coefficients to generate a first syntax element when performed by the arithmetic decoder once; generating a first statistics result according to the first syntax element decoding result; and controlling a repetition number of a second scan procedure based at least partly on the first syntax element decoding result, and instructing the arithmetic decoder to perform the second scan procedure at least once to generate a second syntax element decoding result of at least a portion of the transform coefficients, wherein the second scan procedure decodes a second coded syntax element of one of the transform coefficients to generate a second syntax element when performed by the arithmetic decoder once.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
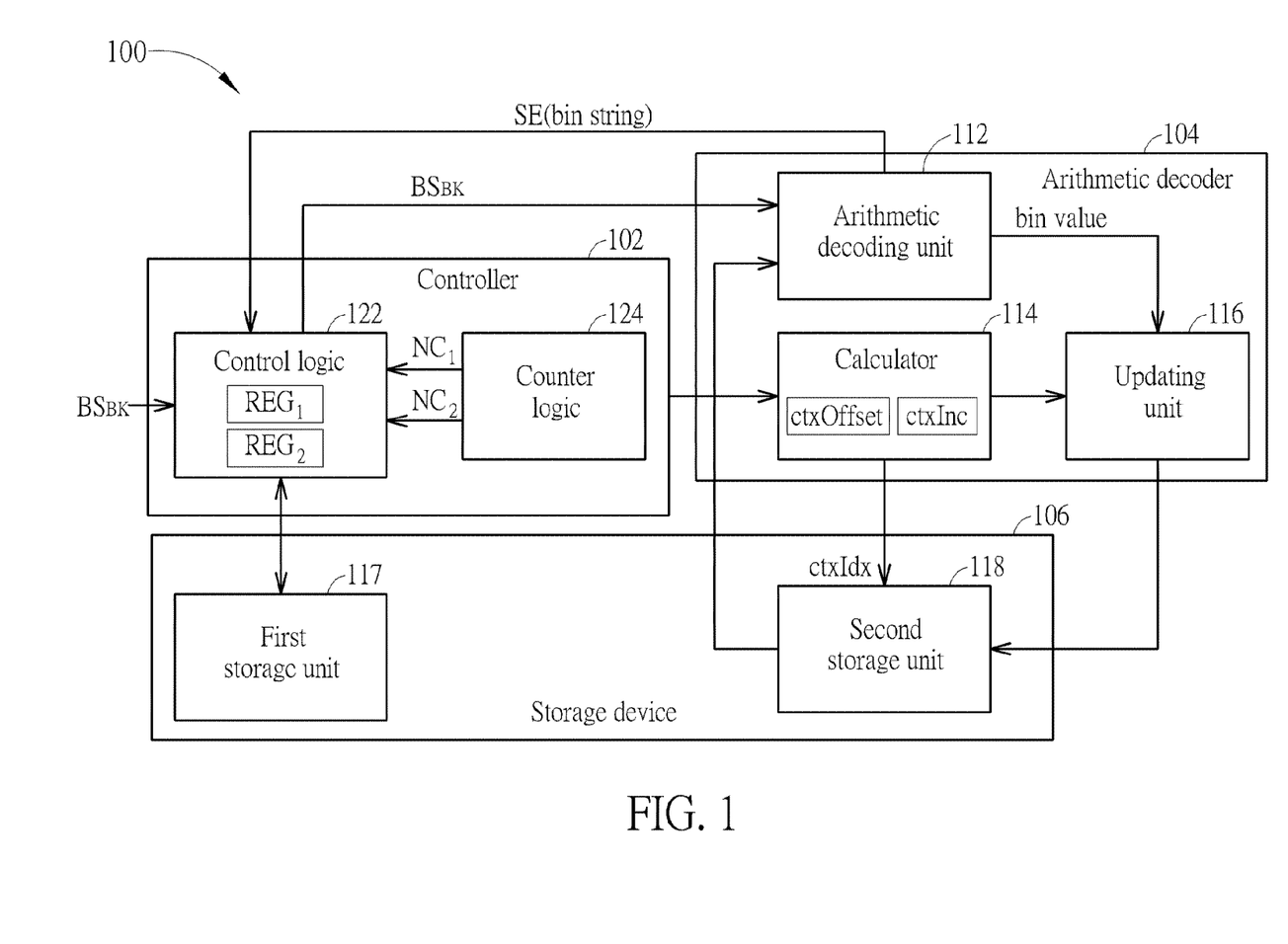
FIG. 1 is a block diagram illustrating a decoding apparatus according to an embodiment of the present invention.

FIG. 1 is a block diagram illustrating a decoding apparatus according to an embodiment of the present invention. For example, the decoding apparatus 100 may be part of an HEVC decoder. In this embodiment, the decoding apparatus 100 includes a controller 102, an arithmetic decoder 104 and a storage device 106, and is capable of decoding a bitstream $BS_{BK}$ of a transform coefficient block of a video frame. The arithmetic decoder 104 is configured to perform arithmetic decoding, such as a CABAC decoding procedure, upon the bitstream $BS_{BK}$ of the transform coefficient block, where the bitstream $BS_{BK}$ includes bins of coded syntax elements of transform coefficients in the transform coefficient block. In this embodiment, the arithmetic decoder 104 includes an arithmetic decoding unit 112, a calculator 114, and an updating unit 116. The arithmetic decoding unit 112 may have a regular-mode decoding engine (not shown) and a bypass-mode decoding engine (not shown). The arithmetic decoding unit 112 may decode at least one bin of a syntax element at a time.

When a bin (i.e., a bit) is encoded in a bypass mode, the bypass-mode decoding engine may be enabled to decode the bin. It should be noted that no context selection and context updating is involved in the bypass-mode decoding process. Hence, the calculator 114 and the updating unit 116 may not be active in the bypass-mode decoding process. However, when a bin (i.e., a bit) is encoded in a regular mode, the regular-mode decoding engine is enabled to decode the bin. As known to those skilled in the pertinent art, the CABAC decoding in the regular mode may include a context selection process, an arithmetic decoding process, and a context updating process. Hence, the calculator 114 and the updating unit 116 may be active in the regular-mode decoding process. Further details of the calculator 114 and the updating unit 116 are described as below.

The second storage unit 118 of the storage device 106 may be implemented using a static random access memory (SRAM). The second storage unit 118 is used for storing context variables (i.e., context model data), where each context variable corresponds to probable values of a bin of a syntax element and the probability of each of the probable value. The calculator 114 is used for dealing with the context selection process by determining a context index ctxIdx, such that a context variable indexed by the context index ctxIdx is read from the second storage unit 118 and then provided to the arithmetic decoding unit 112. The context index ctxIdx may be expressed by the sum of a context index offset ctxOffset and a context index increment ctxInc. The context index offset ctxOffset is uniquely defined according to the type of the syntax element. In other words, when a bin to be decoded is part of a first syntax element, the context index offset ctxOffset is set by a first predetermined value; and when a bin to be decoded is part of a second syntax element, the context index offset ctxOffset is set by a second predetermined value.

The calculator 114 evaluates the context index increment ctxInc in the context selection process. In one exemplary design, the calculator 114 may have several dedicated logics, where each dedicated logic is used for calculating the context index increment ctxInc of one corresponding syntax element. In another exemplary design, the calculator 114 may have several common basic logics, and the context index increment ctxInc of each syntax element can be calculated by a combination of part or all of the common basic logics. However, this is for illustrative purposes only, and is not meant to be a limitation of the present invention.

The regular-mode decoding engine of the arithmetic decoding unit 112 is responsible for dealing with the arithmetic decoding process by generating a bin value based on a context variable selected for a bin to be decoded. The updating unit 116 is responsible for dealing with the context updating process. Specifically, after a decoding process of a bin is completed, the updating unit 116 updates the corresponding context variable in the second storage unit 118 in accordance with a decoding result of the bin (i.e., the bin value generated from the regular-mode decoding engine of the arithmetic decoding unit 112).

After a portion of the bitstream $BS_{BK}$ (e.g., all bins of one coded syntax element) has been successfully decoded by regular-mode decoding engine or bypass-mode decoding engine of the arithmetic decoding unit 112, a bin string representative of a syntax element SE is generated correspondingly.

In this embodiment, the controller 102 is coupled to the arithmetic decoder 104, and is configured to instruct the arithmetic decoder 104 to perform a plurality of different scan procedures, each used to decode a partial bitstream derived from the bitstream $BS_{BK}$ of the transform coefficient block to generate a syntax elements SE of one transform coefficient in the transform coefficient block. At the encoder side, the transform coefficients in the transform coefficient block are encoded using arithmetic encoding such as a CABAC encoding procedure, such that the bitstream $BS_{BK}$ is generated from encoding the transform coefficients in the transform coefficient block.

Figure 2:
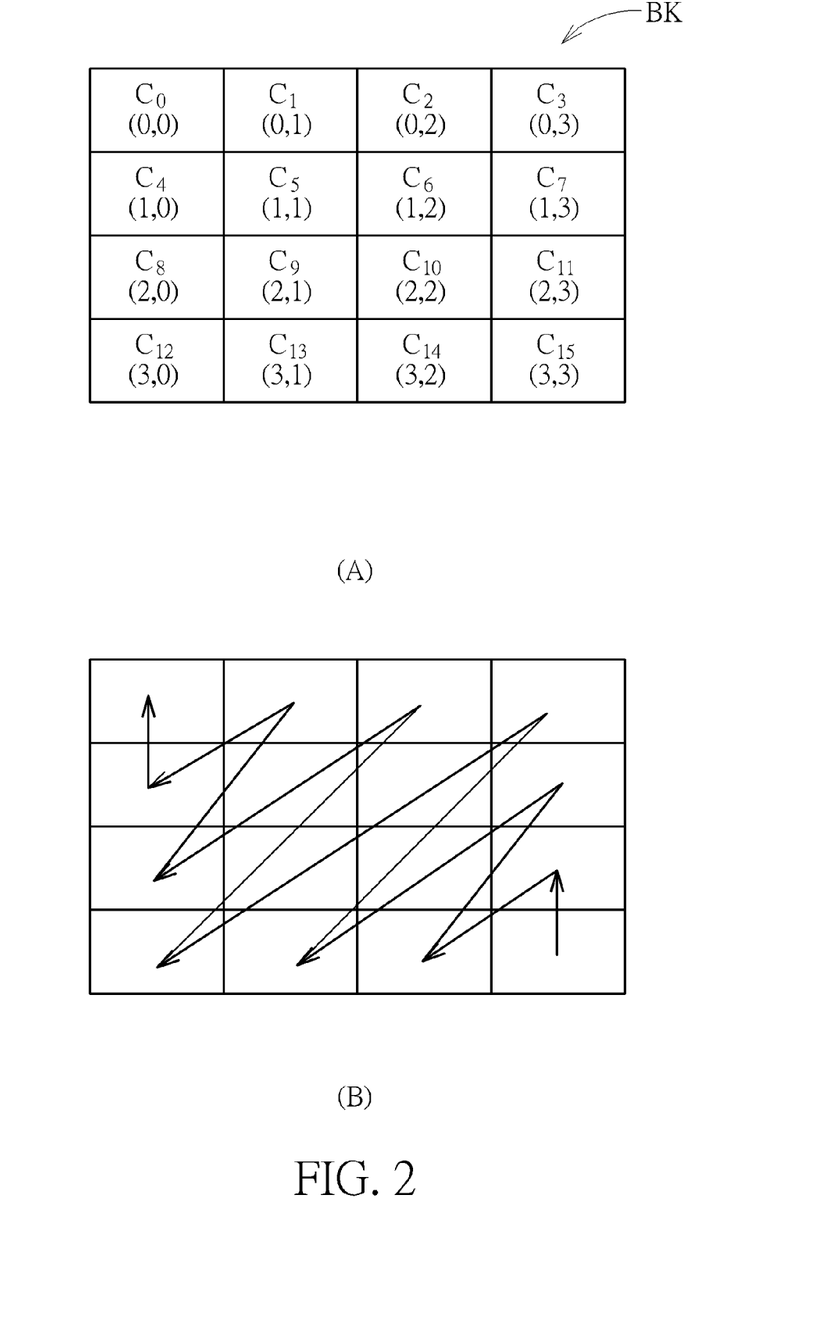
FIG. 2 is a diagram illustrating a transform coefficient block of a frame and a scan pattern adopted for encoding transform coefficients included in the transform coefficient block according to an embodiment of the present invention.

FIG. 2 is a diagram illustrating a transform coefficient block of a video frame and a scan pattern adopted for encoding transform coefficients included in the transform coefficient block according to an embodiment of the present invention. The size of the transform coefficient block BK is 4×4. Hence, as shown in sub-diagram (A) of FIG. 2, the transform coefficient block BK includes 16 transform coefficients $C_0$-$C_{15}$ corresponding to 16 locations (0,0)-(3,3), respectively. In a case where a diagonal scan pattern as shown in sub-diagram (B) of FIG. 2 is used, the transform coefficients $C_0$-$C_{15}$ in the transform coefficient block BK are scanned based on the processing order defined by the diagonal scan pattern. Hence, the transform coefficient $C_{15}$ is the first scanned transform coefficient, and the transform coefficient $C_0$ is the last scanned transform coefficient. Up to five scan procedures may be applied to the transform coefficients $C_0$-$C_{15}$, and all the scan procedures follow the same scan pattern. Each scan procedure is used to encode a syntax element for one of the transform coefficients $C_0$-$C_{15}$. In each scan procedure, a syntax element is encoded only when necessary. Since the decoding operation is an inverse of the encoding operation. Thus, the arithmetic decoder 104 is controlled by the controller 102 to perform up to five scan procedures for decoding all coded syntax elements of the transform coefficients $C_0$-$C_{15}$ included in the transform coefficient block BK. For example, a specific scan procedure may decode a partial bitstream derived from the incoming bitstream $BS_{BK}$ of the transform coefficient block to output a specific syntax element of one transform coefficient when performed by the arithmetic decoder 104 once.

In addition to instructing the arithmetic decoder 104 to perform different scan procedures, the controller 102 is further configured to control a repetition number of a scan procedure (i.e., the number of times one scan procedure is executed) based on one syntax element decoding result generated from a different scan procedure (or multiple syntax element decoding results generated from different scan procedures). In this embodiment, the controller 102 includes a control logic 122 and a counter logic 124. The counter logic 124 is used to generate one or more statistics results (e.g., counter values $NC_1$ and $NC_2$) according to one or more syntax element decoding results generated from one or more scan procedures performed by the arithmetic decoder 104. For example, the counter logic 124 may generate a first statistics result (e.g., counter value $NC_1$) according to one syntax element decoding result (e.g., $D_{SE\_}1$), and may further generate a second statistics result (e.g., counter value $NC_2$) according to at least two syntax element decoding results (e.g., $D_{SE\_}2$ and $D_{SE\_}3$). The control logic 122 refers to at least one of the statistics results (e.g., at least one of the counter values $NC_1$ and $NC_2$) to control the repetition number of a specific scan procedure. In this way, the number of times the arithmetic decoder 104 performs the specific scan procedure may be controlled to be smaller than the number of transform coefficients $C_0$-$C_{15}$ in the transform coefficient block BK, thus leading to better decoding efficiency. Further details are described as below.

Figure 3:
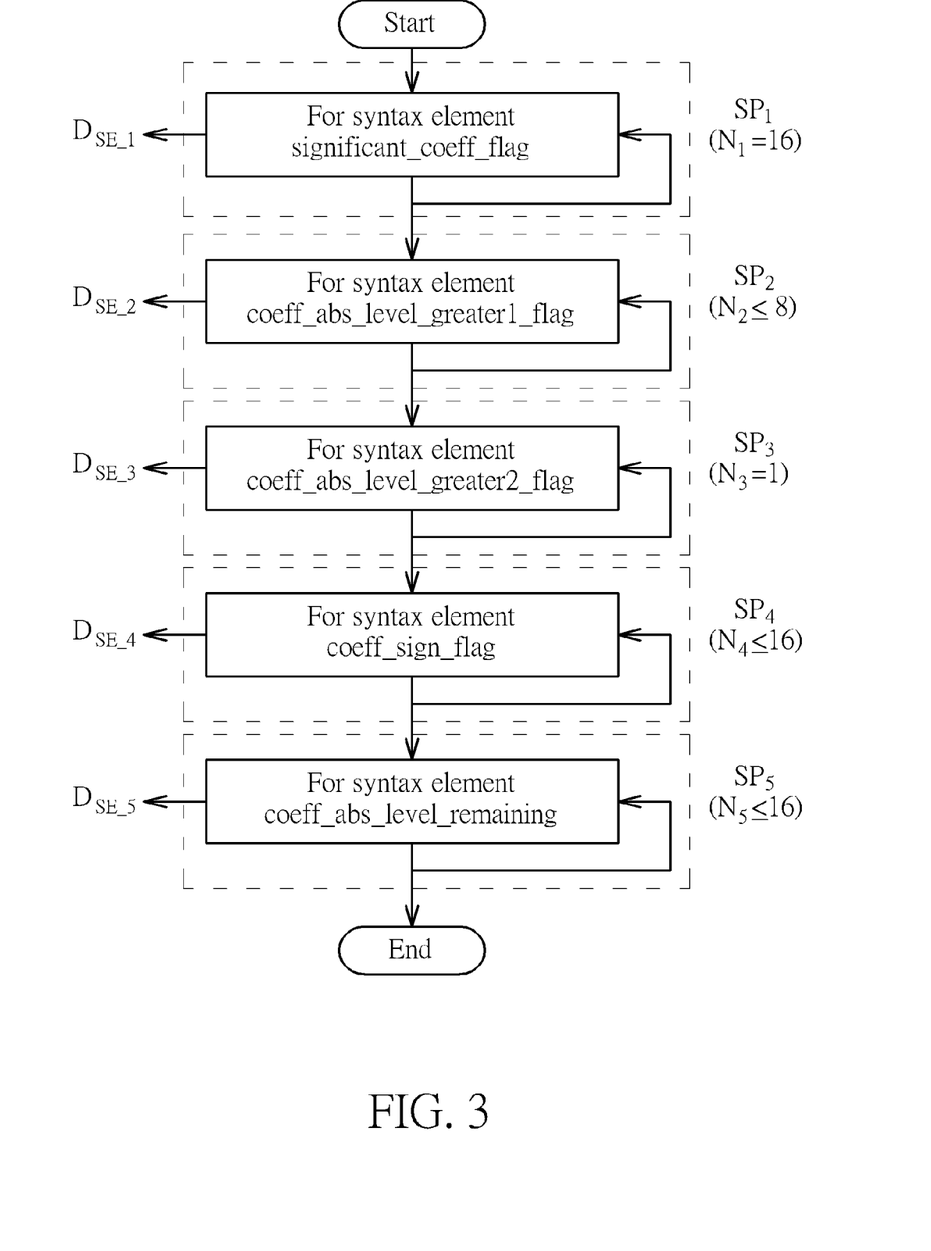
FIG. 3 is a diagram illustrating a decoding process of one 4×4 transform coefficient block according to an embodiment of the present invention.

FIG. 3 is a diagram illustrating a decoding process of one 4×4 transform coefficient block according to an embodiment of the present invention. In the beginning, the control logic 122 of the controller 102 instructs the arithmetic decoder 104 to perform a scan procedure $SP_1$ at least once (e.g., 16 times), where the scan procedure $SP_1$ decodes a partial bitstream, including a coded syntax element of one of the transform coefficients $C_0$-$C_{15}$, to generate a syntax element significant_coeff_flag when performed by the arithmetic decoder 104 once. In this embodiment, the control logic 122 controls the repetition number $N_1$ of the scan procedure $SP_1$ to be 16, such one syntax element significant_coeff_flag of each of the transform coefficients $C_0$-$C_{15}$ will be generated by the arithmetic decoder 104. In other words, the scan procedure $SP_1$ is performed upon each of the locations (0,0)-(3,3) within the transform coefficient block BK. Hence, the syntax element decoding result $D_{SE\_}1$ of the transform coefficients $C_0$-$C_{15}$ includes syntax elements significant_coeff_flag of all of the transform coefficients $C_0$-$C_{15}$, where each syntax element significant_coeff_flag indicates whether a corresponding transform coefficient is non-zero or not. For example, when significant_coeff_flag=1, it indicates that the corresponding transform coefficient has a non-zero value; and when significant_coeff_flag=0, it indicates that the corresponding transform coefficient has a zero value. Further, when a syntax element significant_coeff_flag of a specific transform coefficient indicates that the specific transform coefficient is a non-zero value, the specific transform coefficient may be regarded as having an intermediate value equal to one, and additional syntax elements should be checked to determine a final value of the specific transform coefficient. However, when the syntax element significant_coeff_flag of the specific transform coefficient indicates that the specific transform coefficient is a zero value, the final value of the specific transform coefficient is confirmed to be the zero value, and there is no need to check additional syntax elements, including coeff_abs_level_greater1_flag, coeff_abs_level_greater2_flag, and coeff_sign_flag, and coeff_abs_level_remaining. Specifically, the bitstream $BS_{BK}$ of the transform coefficient block BK may not have coded syntax elements coeff_abs_level_greater1_flag, coeff_abs_level_greater2_flag, coeff_sign_flag, and coeff_abs_level_remaining for the specific transform coefficient. The following scan procedures $SP_2$, $SP_3$, $SP_4$, and $SP_5$ performed upon a location corresponding to the specific transform coefficient may be omitted.

The counter logic 124 is configured to refer to the syntax element decoding result $D_{SE\_}1$ of the transform coefficients $C_0$-$C_{15}$ (i.e., syntax elements significant_coeff_flag of the transform coefficients $C_0$-$C_{15}$) to count the number of transform coefficients each having a non-zero value and accordingly output a counter value $NC_1$ to the control logic 122. The control logic 122 may store the counter value $NC_1$ into a register $REG_1$ for future use. In this embodiment, the control logic 122 is configured to control the repetition number $N_2$ of the scan procedure $SP_2$ and/or the repetition number $N_4$ of the scan procedure $SP_2$ according to the counter value $NC_1$. In addition, the counter value $NC_1$ may be involved in deciding the repetition number $N_5$ of the scan procedure $SP_5$.

To facilitate computation of final values of non-zero transform coefficients and repetition control of following scan procedures, the control logic 122 is further configured to store information of locations and intermediate values of non-zero transform coefficients found by scan procedure $SP_1$ into the first storage unit 117 of the storage device 106. By way of example, but not limitation, the first storage unit 117 may be implemented using registers.

Figure 4:
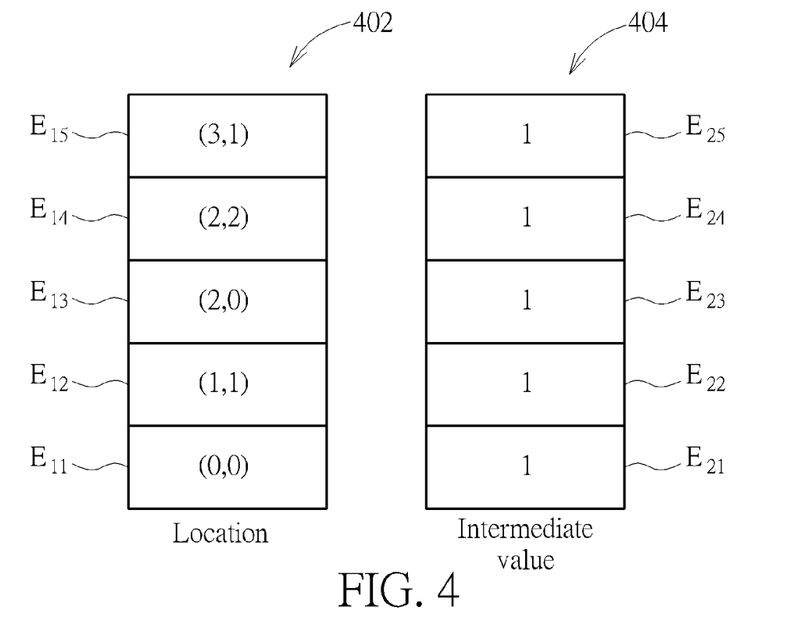
FIG. 4 is a diagram illustrating a first data structure used for storing information of locations and intermediate values of non-zero transform coefficients according to an embodiment of the present invention.

FIG. 4 is a diagram illustrating a first data structure used for storing information of locations and intermediate values of non-zero transform coefficients according to an embodiment of the present invention. In this exemplary embodiment, one 1D array 402 may be used to store the location information, and another 1D array 404 may be used to store the intermediate value information. Assume that syntax elements significant_coeff_flag of the transform coefficients $C_0$, $C_5$, $C_8$, $C_{10}$, and $C_{13}$ indicate that the corresponding transform coefficients have non-zero values, while syntax elements significant_coeff_flag of the remaining transform coefficients indicate that the corresponding transform coefficients have zero values. The array elements $E_{11}$-$E_{15}$ of the array 402 store location information (0,0), (1,1), (2,0), (2,2), and (3,1), respectively, and the array elements $E_{21}$-$E_{25}$ of the array 404 store intermediate value information 1, 1, 1, 1, and 1, respectively.

Figure 5:
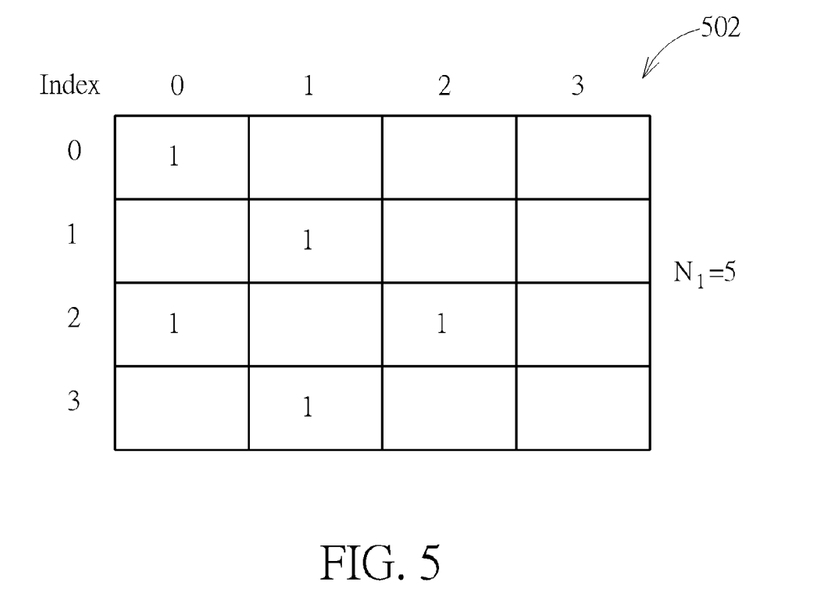
FIG. 5 is a diagram illustrating a second data structure used for storing information of locations and intermediate values of non-zero transform coefficients according to an embodiment of the present invention.

FIG. 5 is a diagram illustrating a second data structure used for storing information of locations and intermediate values of non-zero transform coefficients according to an embodiment of the present invention. In this exemplary embodiment, one 2D array (e.g., 4×4 array) 502 may be used to store the location information as well as the intermediate value information, where the location information is recorded using index values, and the intermediate value information is recorded in array elements indexed by the location information. For clarity and simplicity, the following assumes that the data structure shown in FIG. 5 is employed in the first storage unit 117.

In this example, syntax elements significant_coeff_flag of the transform coefficients $C_0$, $C_5$, $C_8$, $C_{10}$, and $C_{13}$ indicate that transform coefficients $C_0$, $C_5$, $C_8$, $C_{10}$, and $C_{13}$ have non-zero values. Hence, the counter value $NC_1$ is set by 5 and stored in the register $REG_1$. Next, the control logic 122 of the controller 102 instructs the arithmetic decoder 104 to perform another scan procedure $SP_2$ at least once, where the scan procedure $SP_2$ decodes a partial bitstream, including a coded syntax element of one of the transform coefficients $C_0$-$C_{15}$, to generate a syntax element coeff_abs_level_greater1_flag when performed by the arithmetic decoder 104 once. In this embodiment, the control logic 122 controls the repetition number $N_2$ of the scan procedure $SP_2$ based at least partly on the syntax element decoding result $D_{SE\_}1$. Specifically, the control logic 122 controls the repetition number $N_2$ of the scan procedure $SP_2$ according to the counter value $NC_1$ derived from the syntax element decoding result $D_{SE\_}1$. In accordance with HEVC, the syntax element coeff_abs_level_greater1_flag is coded for at most 8 non-zero transform coefficients in one 4×4 transform coefficient block. The control logic 122 is configured to compare the counter value $NC_1$ with a threshold value (e.g., 8), and set the repetition number $N_2$ of the scan procedure $SP_2$ based on a comparison result. For example, $N_2=NC_1$ if $NC_1 \leq 8$, and $N_2=8$ if $NC_1>8$. Hence, when $NC_1 \leq 8$, the scan procedure $SP_2$ is performed upon locations corresponding to all non-zero transform coefficients identified by the previous scan procedure $SP_1$. When $NC_1>8$, the scan procedure $SP_2$ is performed upon locations corresponding to the first 8 non-zero transform coefficients, such that locations corresponding to the remaining non-zero transform coefficients will not be checked by the scan procedure $SP_2$.

The scan procedure $SP_2$ is performed for $N_2$ locations within the transform coefficient block BK. Hence, the syntax element decoding result $D_{SE\_}2$ of at least a portion of the transform coefficients $C_0$-$C_{15}$ includes syntax elements coeff_abs_level_greater1_flag of $N_2$ transform coefficients, where each syntax element coeff_abs_level_greater1_flag indicates whether a corresponding transform coefficient is greater than one. For example, when coeff_abs_level_greater1_flag=1, it indicates that the corresponding transform coefficient is greater than one; and when coeff_abs_level_greater1_flag=0, it indicates that the corresponding transform coefficient is not greater than one. When a syntax element coeff_abs_level_greater1_flag of a specific non-zero transform coefficient indicates that the specific non-zero transform coefficient is greater than one, the specific non-zero transform coefficient may be regarded as having an intermediate value equal to two, and additional syntax elements should be checked to determine a final value of the specific non-zero transform coefficient. However, when the syntax element coeff_abs_level_greater1_flag of the specific non-zero transform coefficient indicates that the specific non-zero transform coefficient is not greater than one, a final absolute value of the specific non-zero transform coefficient is confirmed to be one, and there is no need to check additional syntax elements, including coeff_abs_level_greater2$_{13}$ flag and coeff_abs_level_remaining. Specifically, the bitstream $BS_{BK}$ of the transform coefficient block BK may not have coded syntax elements coeff_abs_level_greater2_flag and coeff_abs_level_remaining for the specific non-zero transform coefficient. The following scan procedures $SP_3$ and $SP_5$ performed upon a location corresponding to the specific non-zero transform coefficient may be omitted.

The counter logic 124 is configured to refer to the syntax element decoding result $D_{SE\_}2$ of $N_2$ transform coefficients (i.e., syntax elements coeff_abs_level_greater1_flag of $N_2$ transform coefficients) to count the number of transform coefficients each having an absolute value equal to either of one and two, and accordingly output another counter value $NC_2$ to the control logic 122. The control logic 122 may store the counter value $NC_2$ into another register $REG_2$ for future use.

Figure 6:
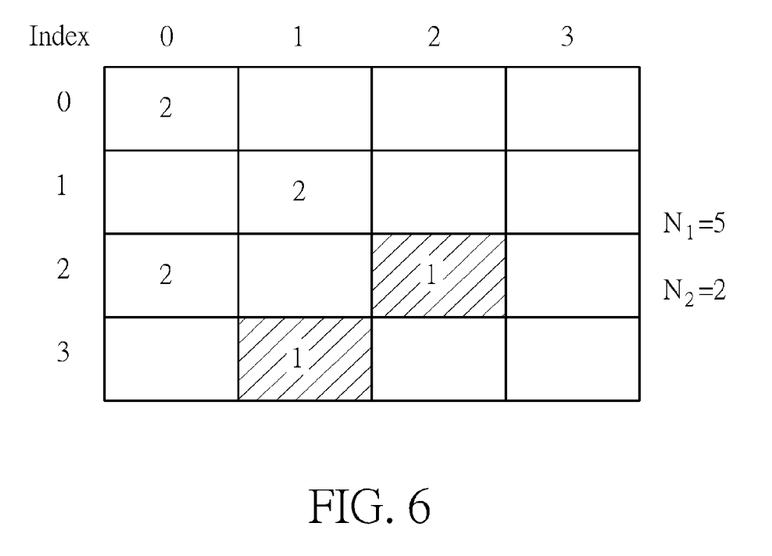
FIG. 6 is a diagram illustrating a storage state of intermediate values of non-zero transform coefficients after a scan procedure is performed upon each of locations corresponding to non-zero transform coefficients.

To facilitate computation of final values of non-zero transform coefficients and repetition control of following scan procedures, the control logic 122 updates intermediate values in the first storage unit 117 of the storage device 106 according to non-zero transform coefficients that found by scan procedures $SP_2$ to be greater than one. Assume that syntax elements coeff_abs_level_greater1_flag of the transform coefficients $C_0$, $C_5$, and $C_8$ indicate that transform coefficients $C_0$, $C_5$, and $C_8$ have absolute values greater than one. Hence, the intermediate values stored in array elements corresponding to locations (0,0), (1,1), and (2,0) are updated to be two, as shown in FIG. 6. It should be noted that, since syntax elements coeff_abs_level_greater1_flag of the transform coefficients $C_{10}$ and $C_{13}$ indicate that transform coefficients $C_{10}$ and $C_{13}$ have absolute values not greater than one, the final absolute values of the transform coefficients $C_{10}$ and $C_{13}$ are confirmed to be one. Since there are two non-zero transform coefficients confirmed to have absolute values each equal to one, the counter value $NC_2$ is set by 2 correspondingly.

Next, the control logic 122 of the controller 102 instructs the arithmetic decoder 104 to perform another scan procedure $SP_3$ at least once (e.g., one time only), where the scan procedure $SP_3$ decodes a partial bitstream, including a coded syntax element of one of the transform coefficients $C_0$-$C_{15}$, to generate a syntax element coeff_abs_level_greater2_flag when performed by the arithmetic decoder 104 once. In accordance with HEVC, the syntax element coeff_abs_level_greater2_flag is coded for only a single non-zero transform coefficient in one 4×4 transform coefficient block. Hence, during the decoding process of the transform coefficient block BK, the arithmetic decoder 104 performs the scan procedure $SP_3$ only once, such that the control logic 122 directly sets the repetition number $N_3$ of the scan procedure $SP_3$ by one.

The scan procedure $SP_2$ is only performed for a location of one transform coefficient with a syntax element coeff_abs_level_greater1_flag indicating that the corresponding transform coefficient has an absolute value greater than one. Hence, the syntax element decoding result $D_{SE\_}3$ of at least a portion of the transform coefficients $C_0$-$C_{15}$ only includes a syntax element coeff_abs_level_greater2_flag of one transform coefficient with a syntax element coeff_abs_level_greater1_flag indicating that the corresponding transform coefficient has an absolute value greater than one, where the syntax element coeff_abs_level_greater2_flag indicates whether an absolute value of the corresponding transform coefficient is greater than two. For example, when coeff_abs_level_greater2_flag=1, it indicates that the absolute value of the corresponding transform coefficient is greater than two; and when coeff_abs_level_greater2_flag=0, it indicates that the absolute value of the corresponding transform coefficient is not greater than two. When a syntax element coeff_abs_level_greater2_flag of a specific non-zero transform coefficient indicates that the absolute value of the specific non-zero transform coefficient is greater than two, the specific non-zero transform coefficient may be regarded as having an intermediate value equal to three, and additional syntax elements should be checked to determine a final value of the specific non-zero transform coefficient. However, when the syntax element coeff_abs_level_greater2_flag of the specific non-zero transform coefficient indicates that the absolute value of the specific non-zero transform coefficient is not greater than two, the final absolute value of the specific non-zero transform coefficient is confirmed to be two, and there is no need to check the additional syntax element coeff_abs_level_remaining. Specifically, the bitstream $BS_{BK}$ of the transform coefficient block BK may not have a coded syntax element coeff_abs_level_remaining for the specific non-zero transform coefficient. The following scan procedure $SP_5$ performed upon a location corresponding to the specific non-zero transform coefficient may be omitted.

The counter logic 124 is further configured to refer to the syntax element decoding result $D_{SE\_}3$ of one transform coefficient (i.e., a syntax element coeff_abs_level_greater2_flag of one transform coefficient) to selectively update the number of transform coefficients each having an absolute value equal to either of one and two. When the syntax element coeff_abs_level_greater2_flag indicates that the absolute value of the corresponding transform coefficient is greater than two, the counter value $N_2$ stored in the register $REG_2$ remains unchanged. However, when the syntax element coeff_abs_level_greater2_flag indicates that the absolute value of the corresponding transform coefficient is not greater than two, the counter logic 124 adds one to the current counter value $N_2$, and outputs an updated counter value $N_2$ to the control logic 122. Since there are two non-zero transform coefficients confirmed to have absolute values each equal to one and one non-zero transform coefficient confirmed to have an absolute value equal to two, the counter value $NC_2$ stored in the register $REG_2$ is updated to be three correspondingly.

Figure 7:
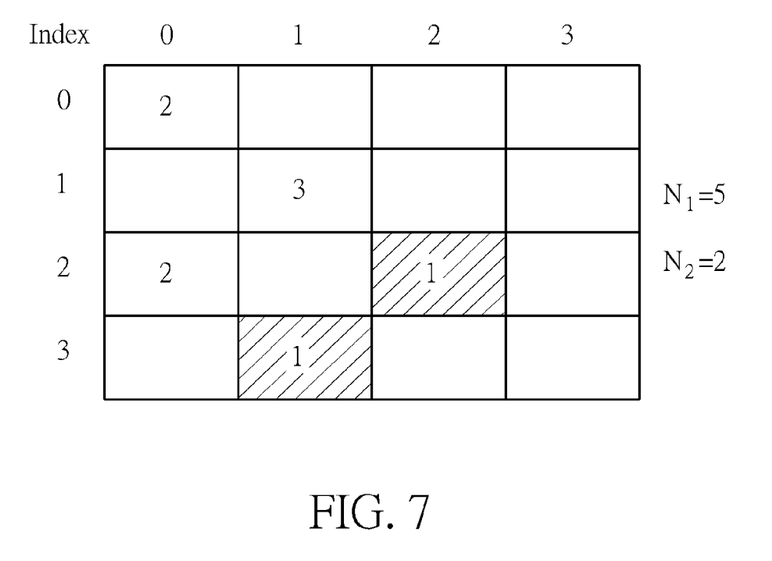
FIG. 7 is a diagram illustrating a storage state of intermediate values of non-zero transform coefficients after a scan procedure is performed upon each of locations corresponding to non-zero transform coefficients each having an absolute value greater than one.

Assume that the scan procedure $SP_3$ is performed upon the location (1,1) corresponding to the transform coefficient $C_5$ having an absolute value greater than one, and a syntax element coeff_abs_level_greater2_flag of the transform coefficient $C_5$ indicates that the transform coefficient $C_5$ has an absolute value greater than two. Hence, the intermediate value stored in an array element corresponding to location (1,1) is updated to be three, as shown in FIG. 7. It should be noted that only the final absolute values of the transform coefficients $C_{10}$ and $C_{13}$ are already confirmed. The counter value $NC_2$ is set by 2 correspondingly.

Figure 8:
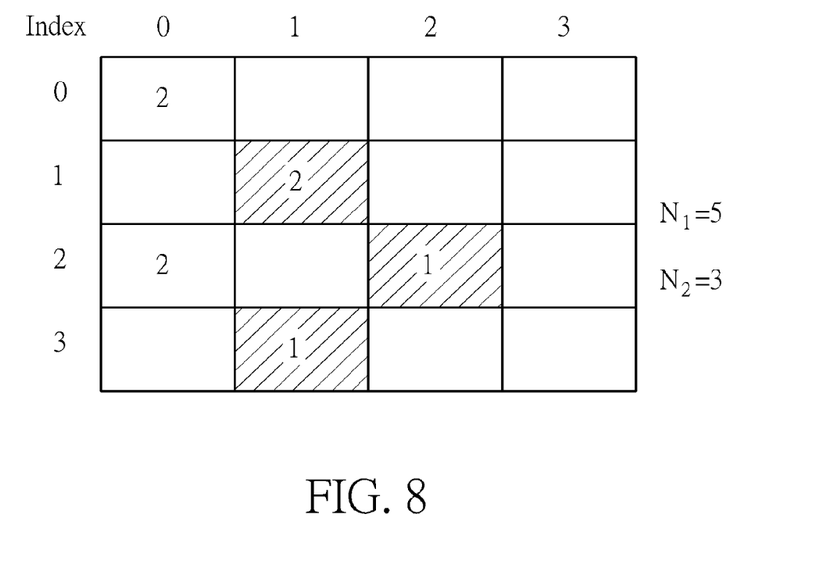
FIG. 8 is a diagram illustrating another storage state of intermediate values of non-zero transform coefficients after a scan procedure is performed upon each of locations corresponding to non-zero transform coefficients each having an absolute value greater than one.

Assume that the scan procedure $SP_3$ is performed upon the location (1,1) corresponding to the transform coefficient $C_5$ having an absolute value greater than one, and the syntax element coeff_abs_level_greater2_flag of the transform coefficient $C_5$ indicates that transform coefficient $C_5$ has an absolute values not greater than two. Hence, the final absolute value of the transform coefficient $C_5$ is confirmed to be two, as shown in FIG. 8. It should be noted that the final absolute values of the transform coefficients $C_5$, $C_{10}$ and $C_{13}$ are already confirmed. The counter value $NC_2$ is set by 3 correspondingly.

Next, the control logic 122 of the controller 102 instructs the arithmetic decoder 104 to perform another scan procedure $SP_4$ at least once (e.g., $NC_1$ times), where the scan procedure $SP_4$ decodes a partial bitstream, including a coded syntax element of one of the transform coefficients $C_0$-$C_{15}$, to generate a syntax element coeff_sign_flag when performed by the arithmetic decoder 104 once. In this embodiment, the control logic 122 controls the repetition number $N_4$ of the scan procedure $SP_4$ based at least partly on the syntax element decoding result $D_{SE\_}1$. As mentioned above, when the syntax element significant_coeff_flag of a specific transform coefficient indicates that the specific transform coefficient is a zero value, the final value of the specific transform coefficient is confirmed to be the zero value. Hence, there is no need to check an additional syntax element to identify the sign information of the specific transform coefficient. The control logic 122 therefore controls the repetition number $N_4$ of the scan procedure $SP_4$ according to the counter value $NC_1$ derived from the syntax element decoding result $D_{SE\_}1$. Specifically, the repetition number $N_4$ of the scan procedure $SP_4$ is set by the counter value $NC_1$. Hence, the syntax element decoding result $D_{SE\_}4$ of at least a portion of the transform coefficients $C_0$-$C_{15}$ includes syntax elements coeff_sign_flag of $NC_1$ transform coefficients, where each syntax element coeff_sign_flag indicates sign information of a corresponding transform coefficient. For example, when coeff_sign_flag=1, it indicates that the corresponding transform coefficient is a positive value; and when coeff_sign_flag=0, it indicates that the corresponding transform coefficient is a negative value.

As mentioned above, syntax elements significant_coeff_flag of the transform coefficients $C_0$, $C_5$, $C_8$, $C_{10}$, and $C_{13}$ indicate that transform coefficients $C_0$, $C_5$, $C_8$, $C_{10}$, and $C_{13}$ have non-zero values. Hence, the scan procedure $SP_4$ is performed upon each of the locations (0,0), (1,1), (2,0), (2,2), (3,1) corresponding to the non-zero transform coefficients $C_0$, $C_5$, $C_8$, $C_{10}$, and $C_{13}$. Hence, the sign information of the non-zero transform coefficients $C_0$, $C_5$, $C_8$, $C_{10}$, and $C_{13}$ is decided.

Next, the control logic 122 of the controller 102 instructs the arithmetic decoder 104 to perform another scan procedure $SP_5$ at least once, where the scan procedure $SP_5$ decodes a partial bitstream, including a coded syntax element of one of the transform coefficients $C_0$-$C_{15}$, to generate a syntax element coeff_abs_level_remaining when performed by the arithmetic decoder 104 once. In this embodiment, the control logic 122 controls the repetition number $N_5$ of the scan procedure $SP_4$ based at least partly on the syntax element decoding results $D_{SE}\_1$, $D_{SE}\_2$ and $D_{SE}\_3$. As mentioned above, when the syntax element coeff_abs_level_greater1_flag of a non-zero transform coefficient (which has significant_coeff_flag=1) indicates that the absolute value of the non-zero transform coefficient is not greater than one, the final absolute value of the non-zero transform coefficient is confirmed to be one; and when the syntax element coeff_abs_level_greater2_flag of a non-zero transform coefficient (which has significant_coeff_flag=1) indicates that the absolute value of the non-zero transform coefficient is not greater than two, the final absolute value of the non-zero transform coefficient is confirmed to be two. Hence, when a non-zero transform coefficient is confirmed to have an absolute value equal to either of one and two, there is no need to check an additional syntax element coeff_abs_level_remaining to identify the remaining absolute value. In other words, when a final absolute value of a non-zero transform coefficient is not confirmed yet, an additional syntax element coeff_abs_level_remaining should be checked to identify the remaining absolute value.

The counter value $NC_1$ generated by the counter logic 124 and stored in the register $REG_1$ is indicative of the number of first transform coefficients each having a non-zero value, wherein each first transform coefficient is included in the transform coefficient block BK to be decoded. The counter value $NC_2$ generated/updated by the counter logic 124 and stored in the register $REG_2$ is indicative of the number of second transform coefficients each having an absolute value equal to either of one and two, wherein each second transform coefficient is included in the transform coefficient block BK to be decoded. Hence, the control logic 122 controls the repetition number $N_5$ of the scan procedure $SP_5$ according to the counter values $NC_1$ and $NC_2$. Specifically, the repetition number $N_5$ of the scan procedure $SP_5$ is set by a difference between the counter values $NC_1$ and $NC_2$, i.e., $N_5=NC_1-NC_2$. Hence, the syntax element decoding result $D_{SE}\_5$ of at least a portion of the transform coefficients $C_0$-$C_{15}$ includes syntax elements coeff_abs_level_remaining of $(NC_1-NC_2)$ transform coefficients, where each syntax element coeff_abs_level_remaining indicates a remaining absolute value of a corresponding transform coefficient.

Let the base level BaseLevel of a transform coefficient be defined as $$\text{baseLevel=significant\_coeff\_flag+} \\ \text{coeff\_abs\_level\_greater1\_flag+} \\ \text{coeff\_abs\_level\_greater2\_flag} \quad (1)$$

where a flag has a value of 0 or 1, and is inferred to be 0 if not present. In other words, the base level BaseLevel of the coefficient may be an intermediate value set by scan procedure $SP_1$ only, may be an intermediate value initially set by scan procedure $SP_1$ and then updated by scan procedure $SP_2$, or may be an intermediate value initially set by scan procedure $SP_1$ and then sequentially updated by scan procedures $SP_2$ and $SP_3$. The absolute value absCoeffLevel of the coefficient may be simply defined as below.

$$\text{absCoeffLevel=baseLevel+coeff\_abs\_level\_remaining} \quad (2)$$

With regard to the example shown in FIG. 7, the final absolute values of the non-zero transform coefficients $C_{10}$ and $C_{13}$ are confirmed to be 1 and 1, respectively; and the final absolute values of the non-zero transform coefficients $C_0$, $C_5$ and $C_8$ are not confirmed yet. Thus, the scan procedure $SP_5$ is performed upon each of the locations (0,0), (1,1), and (2,0) corresponding to the non-zero transform coefficients $C_0$, $C_5$ and $C_8$. For example, when the syntax elements coeff_abs_level_remaining of the non-zero transform coefficients $C_0$, $C_5$ and $C_8$ indicate that the remaining absolute values are 5, 3, and 6, the final absolute values of the non-zero transform coefficients $C_0$, $C_5$ and $C_8$ are confirmed to be 5, 6, and 8.

With regard to the example shown in FIG. 8, the final absolute values of the non-zero transform coefficients $C_5$, $C_{10}$ and $C_{13}$ are confirmed to be 2, 1, and 1, respectively; and the final absolute values of the non-zero transform coefficients $C_0$ and $C_8$ are not confirmed yet. Thus, the scan procedure $SP_5$ is performed upon each of the locations (0,0) and (2,0) corresponding to the non-zero transform coefficients $C_0$ and $C_8$. For example, when the syntax elements coeff_abs_level_remaining of the non-zero transform coefficients $C_0$ and $C_8$ indicate that the remaining absolute values are 5 and 3, the final absolute values of the non-zero transform coefficients $C_0$ and $C_8$ are confirmed to be 7 and 5.

In accordance with HEVC, the syntax elements significant_coeff_flag, coeff_abs_level_greater1_flag, and coeff_abs_level_greater2_flag are coded in normal mode, and the syntax elements coeff_sign_flag and coeff_abs_level_remaining are coded in bypass mode. After the needed syntax elements are obtained by the decoding apparatus 100 by performing some or all of the scan procedures $SP_1$-$SP_5$, the final values of the transform coefficients $C_0$-$C_{15}$ in the transform coefficient block BK can be determined. Since the repetition number of the scan procedure performed by the arithmetic decoder 104 can be reduced under the control of the proposed controller 102, the decoding efficiency can be improved greatly.

In above embodiment, the control logic 122 stores the counter value $NC_2$ into the register $REG_2$ when receiving the counter value $NC_2$ generated from the counter logic 124. Hence, the control logic 122 reads the counter values $NC_1$ and $NC_2$ from the registers $REG_1$ and $REG_2$, and subtracts the counter value $NC_2$ from the counter value $NC_1$ to generate a difference value used to control the repetition number $N_5$ of the scan procedure $SP_5$. However, this is for illustrative purposes only, and is not meant to be a limitation of the present invention. In an alternative design, the control logic 122 may be configured to subtract the counter value $NC_2$ from the counter value $NC_1$ to generate a difference value when receiving the counter value $NC_2$ generated from the counter logic 124, and then stores the difference value into the register $REG_2$. Hence, the control logic 122 may directly read the difference value from the register $REG_2$ to control the repetition number $N_5$ of the scan procedure $SP_5$.

Figure 9:
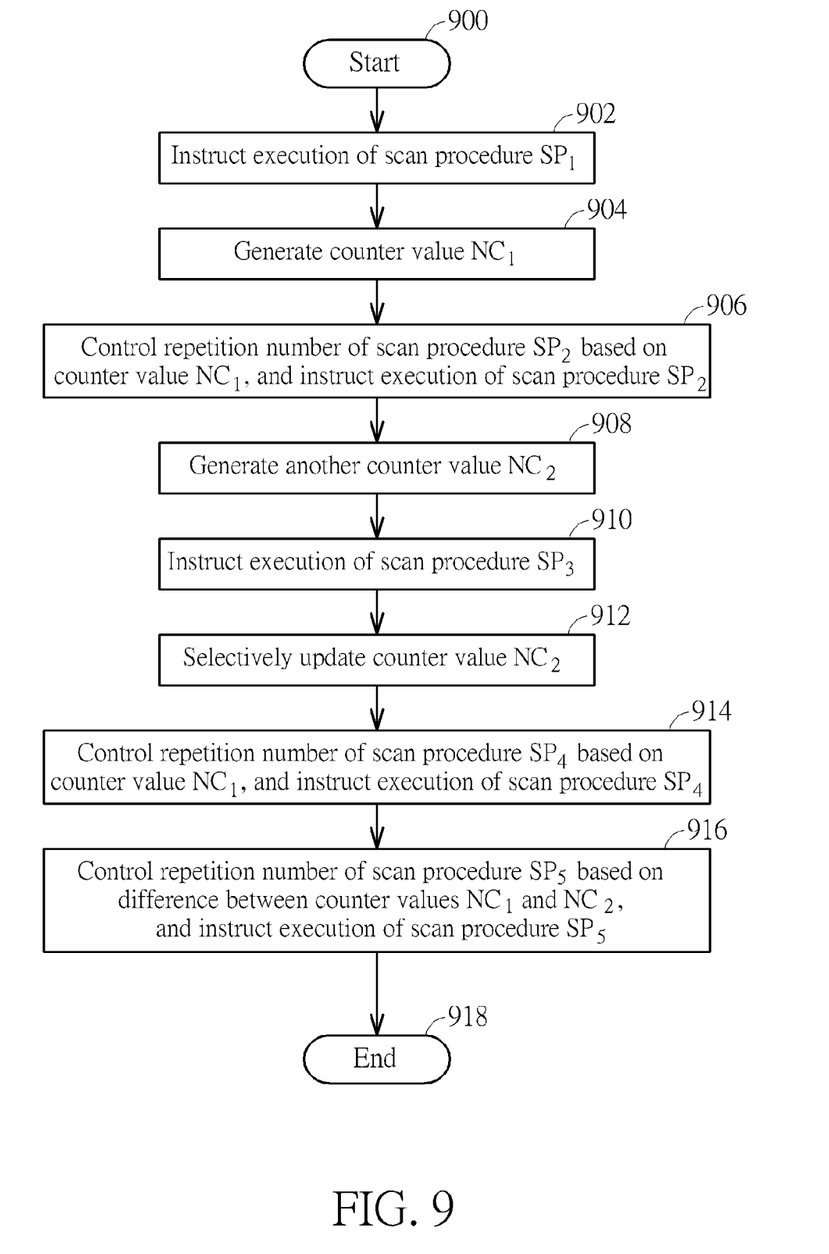
FIG. 9 is a flowchart illustrating a method for controlling decoding of a bitstream of a transform coefficient block according to an embodiment of the present invention.

FIG. 9 is a flowchart illustrating a method for controlling decoding of a bitstream of a transform coefficient block according to an embodiment of the present invention. By way of example, but not limitation, the bitstream of the transform coefficient block may be generated from an HEVC encoder, where the transform coefficient block has a plurality of transform coefficients. Provided that the result is substantially the same, the steps are not required to be executed in the exact order shown in FIG. 9. The method may be employed by the controller 102 of the decoding apparatus 100 shown in FIG. 1, and may be briefly summarized as below.

Step 900: Start.

Step 902: Instruct an arithmetic decoder to perform one scan procedure $SP_1$ at least once (e.g., 16 times) to generate a syntax element decoding result $D_{SE\_}1$ of at least a portion (e.g., all) of the transform coefficients, wherein the scan procedure $SP_1$ decodes a partial bitstream, including a coded syntax element of one of the transform coefficients, to generate a syntax element significant_coeff_flag when performed by the arithmetic decoder once.

Step 904: Based on the syntax element decoding result $D_{SE\_}1$, count the number of specific transform coefficients each having a non-zero value, and accordingly generate and store a first counter value $NC_1$.

Step 906: Control a repetition number of another scan procedure $SP_2$ based at least partly on the first counter value $NC_1$, and instruct the arithmetic decoder to perform the scan procedure $SP_2$ at least once to generate a syntax element decoding result $D_{SE\_}2$ of at least a portion of the transform coefficients, wherein the scan procedure $SP_2$ decodes a partial bitstream, including a coded syntax element of one of the transform coefficients, to generate a syntax element coeff_abs_level_greater1_flag when performed by the arithmetic decoder once. The repetition number of another scan procedure $SP_2$ may be limited to a threshold value (e.g., 8) when a comparison result of the first counter value $NC_1$ and the threshold value indicates that the first counter value $NC_1$ exceeds the threshold value.

Step 908: Based on the syntax element decoding result $D_{SE\_}2$, count the number of specific transform coefficients each having an absolute value equal to one, and accordingly generate and store a second counter value $NC_2$.

Step 910: Instruct an arithmetic decoder to perform another scan procedure $SP_3$ at least once (e.g., one time only) to generate a syntax element decoding result $D_{SE\_}3$ of at least a portion (e.g., only one) of the transform coefficients, wherein the scan procedure $SP_3$ decodes a partial bitstream, including a coded syntax element of one of the transform coefficients, to generate a syntax element coeff_abs_level_greater2_flag when performed by the arithmetic decoder once.

Step 912: Based on the syntax element decoding result $D_{SE\_}3$, selectively update the second counter value $NC_2$ for indicating the number of specific transform coefficients each having an absolute value equal to either of one and two.

Step 914: Control a repetition number of another scan procedure $SP_4$ based at least partly on the first counter value $NC_1$, and instruct the arithmetic decoder to perform the scan procedure $SP_4$ at least once (e.g., $NC_1$ times) to generate a syntax element decoding result $D_{SE\_}4$ of at least a portion of the transform coefficients, wherein the scan procedure $SP_4$ decodes a partial bitstream, including a coded syntax element of one of the transform coefficients, to generate a syntax element coeff_sign_flag when performed by the arithmetic decoder once.

Step 916: Control a repetition number of another scan procedure $SP_5$ based at least partly on a difference D between the first counter value $NC_1$ and the second counter value $NC_2$, and instruct the arithmetic decoder to perform the scan procedure $SP_5$ at least once (e.g., D times) to generate a syntax element decoding result $D_{SE\_}5$ of at least a portion of the transform coefficients, wherein the scan procedure $SP_5$ decodes a partial bitstream, including a coded syntax element of one of the transform coefficients, to generate a syntax element coeff_abs_level_remaining when performed by the arithmetic decoder once.

Step 918: End.

As a person skilled in the art can readily understand details of each step shown in FIG. 9 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A decoding apparatus for decoding a bitstream of a transform coefficient block, the transform coefficient block comprising a plurality of transform coefficients, the decoding apparatus comprising:
an arithmetic decoder, configured to perform arithmetic decoding; and
a controller, comprising:
a counter logic, configured to generate a first statistics result according to a first syntax element decoding result; and
a control logic, configured to instruct the arithmetic decoder to perform a first scan procedure at least once to generate the first syntax element decoding result of at least a position of the transform coefficients, control a repetition number of a second scan procedure based at least partly on the first statistics result, and instruct the arithmetic decoder to perform the second scan procedure at least once to generate a second syntax element decoding result of at least a portion of the transform coefficients,
wherein the first scan procedure decodes a first coded syntax element of one of the transform coefficients to generate a first syntax element when performed by the arithmetic decoder once, and
the second scan procedure decodes a second coded syntax element of one of the transform coefficients to generate a second syntax element when performed by the arithmetic decoder once.

2. The decoding apparatus of claim 1, wherein the repetition number of the second scan procedure is smaller than a number of the transform coefficients in the transform coefficient block.

3. The decoding apparatus of claim 1, wherein each first syntax element included in the first syntax element decoding result indicates whether a corresponding transform coefficient is non-zero or not.

4. The decoding apparatus of claim 3, wherein the counter logic is configured to generate a counter value as the first statistics result by counting a number of specific transform coefficients each having a non-zero value, where each specific transform coefficient is included in the transform coefficient block.

5. The decoding apparatus of claim 1, wherein each second syntax element included in the second syntax element decoding result indicates whether an absolute value of a corresponding transform coefficient is greater than one.

6. The decoding apparatus of claim 1, wherein each second syntax element included in the second syntax element decoding result indicates sign information of a corresponding transform coefficient.

7. The decoding apparatus of claim 1, wherein the counter logic is further configured to generate a second statistics result according to at least the second syntax element decoding result and a third syntax element decoding result; and the control logic is further configured to instruct the arithmetic decoder to perform a third scan procedure at least once to generate the third syntax element decoding result of at least a portion of the transform coefficients, control a repetition number of a fourth scan procedure based at least partly on the first statistics result and the second statistics result, and instruct the arithmetic decoder to perform the fourth scan procedure at least once to generate a fourth syntax element decoding result of at least a portion of the transform coefficients, where the third scan procedure decodes a third coded syntax element of one of the transform coefficients to generate a third syntax element when performed by the arithmetic decoder once, and the fourth scan procedure decodes a fourth coded syntax element of one of the transform coefficients to generate a fourth syntax element when performed by the arithmetic decoder once.

8. The decoding apparatus of claim 7, wherein the repetition number of the fourth scan procedure is smaller than a number of the transform coefficients in the transform coefficient block.

9. The decoding apparatus of claim 7, wherein each first syntax element included in the first syntax element decoding result indicates whether a corresponding transform coefficient is non-zero or not; each second syntax element included in the second syntax element decoding result indicates whether an absolute value of a corresponding transform coefficient is greater than one; and each third syntax element included in the third syntax element decoding result indicates whether an absolute value of a corresponding transform coefficient is greater than two.

10. The decoding apparatus of claim 9, wherein the counter logic is configured to generate a first counter value as the first statistics result by counting a number of first transform coefficients each having a non-zero value, and generate a second counter value as the second statistics result by counting a number of second transform coefficients each having an absolute value equal to either one and two, where each first transform coefficient is included in the transform coefficient block, and each second transform coefficient is included in the transform coefficient block;

and the control logic is configured to control the repetition number of the fourth scan procedure according to a difference between the first counter value and the second counter value.

11. The decoding apparatus of claim 7, wherein each fourth syntax element included in the fourth syntax element decoding result indicates a remaining absolute value of a corresponding transform coefficient.

12. A method for controlling decoding of a bitstream of a transform coefficient block, the transform coefficient block comprising a plurality of transform coefficients, the decoding method comprising:

instructing an arithmetic decoder to perform a first scan procedure at least once to generate a first syntax element decoding result of at least a portion of the transform coefficients, wherein the first scan procedure decodes a first coded syntax element of one of the transform coefficients to generate a first syntax element when performed by the arithmetic decoder once;

generating a first statistics result according to the first syntax element decoding result; and controlling a repetition number of a second scan procedure based at least partly on the first statistics result, and instructing the arithmetic decoder to perform the second scan procedure at least once to generate a second syntax element decoding result of at least a portion of the transform coefficients, wherein the second scan procedure decodes a second coded syntax element of one of the transform coefficients to generate a second syntax element when performed by the arithmetic decoder once.

13. The method of claim 12, wherein the repetition number of the second scan procedure is smaller than a number of the transform coefficients in the transform coefficient block.

14. The method of claim 12, wherein each first syntax element included in the first syntax element decoding result indicates whether a corresponding transform coefficient is non-zero or not.

15. The method of claim 14, wherein generating the first statistics result according to the first syntax element decoding result comprises:

generating a counter value as the first statistics result by counting a number of specific transform coefficients each having a non-zero value, wherein each specific transform coefficient is included in the transform coefficient block.

16. The method of claim 12, wherein each second syntax element included in the second syntax element decoding result indicates whether an absolute value of a corresponding transform coefficient is greater than one.

17. The method of claim 12, wherein each second syntax element included in the second syntax element decoding result indicates sign information of a corresponding transform coefficient.

18. The method of claim 12, further comprising:

instructing the arithmetic decoder to perform a third scan procedure at least once to generate a third syntax element decoding result of at least a portion of the transform coefficients, wherein the third scan procedure decodes a third coded syntax element of one of the transform coefficients to generate a third syntax element when performed by the arithmetic decoder once;

generating a second statistics result according to at least the second syntax element decoding result and the third syntax element decoding result; and controlling a repetition number of a fourth scan procedure based at least partly on the first statistics result and the second statistics result, and instructing the arithmetic decoder to perform the fourth scan procedure at least once to generate a fourth syntax element decoding result of at least a portion of the transform coefficients, wherein the fourth scan procedure decodes a fourth coded syntax element of one of the transform coefficients to generate a fourth syntax element when performed by the arithmetic decoder once.

19. The method of claim 18, wherein the repetition number of the fourth scan procedure is smaller than a number of the transform coefficients in the transform coefficient block.

20. The method of claim 18, wherein each first syntax element included in the first syntax element decoding result indicates whether a corresponding transform coefficient is non-zero or not; each second syntax element included in the second syntax element decoding result indicates whether an absolute value of a corresponding transform coefficient is greater than one; and each third syntax element included in the third syntax element decoding result indicates whether an absolute value of a corresponding transform coefficient is greater than two.

21. The method of claim 20, wherein:
generating the first statistics result according to the first syntax element decoding result comprises:
generating a first counter value as the first statistics result by counting a number of first transform coefficients each having a non-zero value, wherein each first transform coefficient is included in the transform coefficient block;
generating the second statistics result according to at least the second syntax element decoding result and the third syntax element decoding result comprises:
generating a second counter value as the second statistic result by counting a number of second transform coefficients each having an absolute value equal to either of one and two, wherein each second transform coefficient is included in the transform coefficient block; and
controlling the repetition number of the fourth scan procedure based at least partly on the first statistics result and the second statistics result comprises:
controlling the repetition number of the fourth scan procedure according to a difference between the first counter value and the second counter value.

22. The method of claim 18, wherein each fourth syntax element included in the fourth syntax element decoding result indicates a remaining absolute value of a corresponding transform coefficient.

* * * * *